Patented Feb. 26, 1952

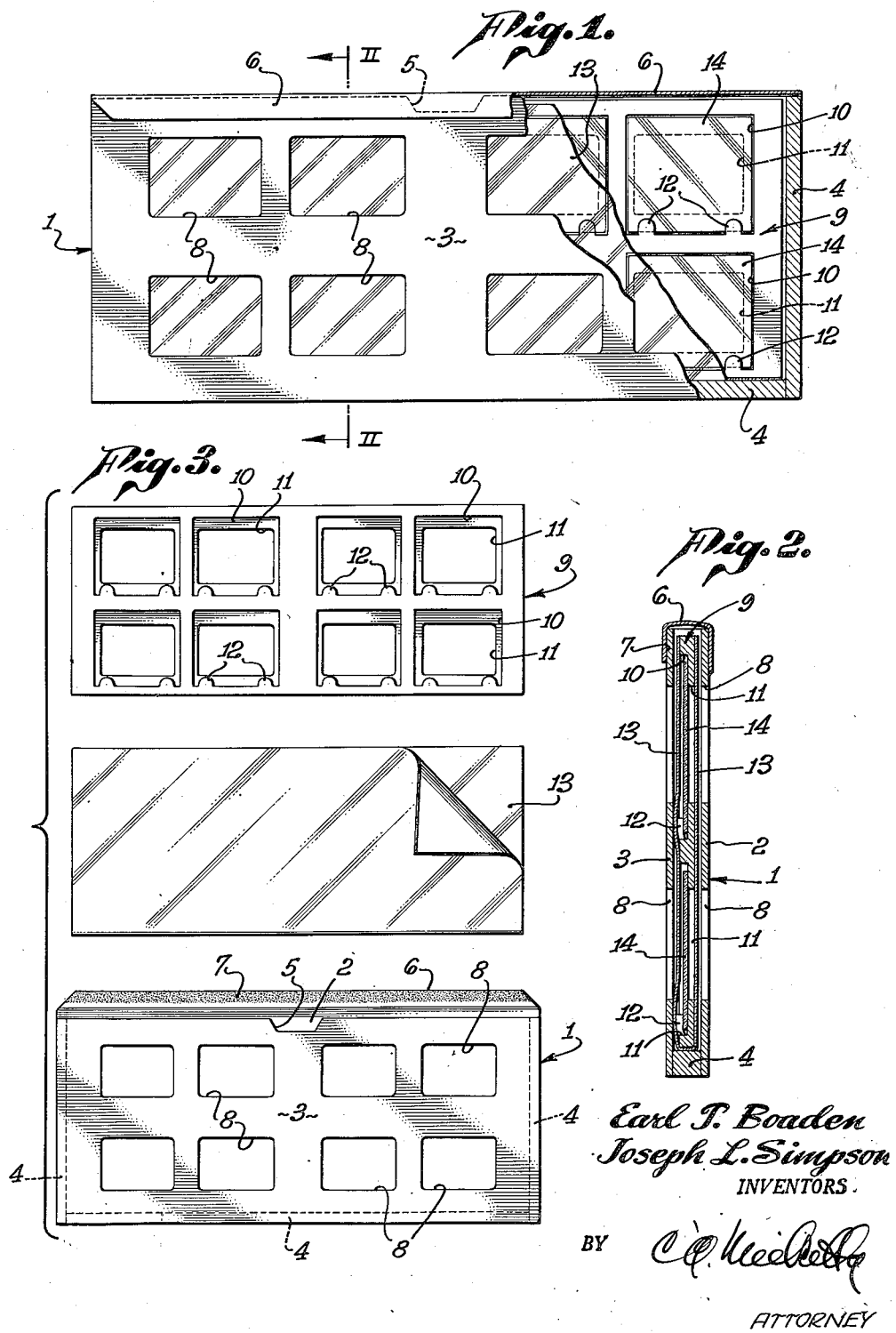

2,587,434

UNITED STATES PATENT OFFICE 2,587,434

TRANSPARENCY PROJECTION SLIDE

Earl T. Boadèn and Joseph L. Simpson, Los Angeles, Calif., assignors to Emde Products, Inc., Culver City, Calif.

Application June 15, 1946, Serial No. 677,070

2 Claims. (Cl. 40—159)

The present invention pertains to an improved mount or holder or projection slide for pictorial representations or transparencies which are to be viewed by transmitted light which may be projected upon a suitable screen, if so desired, or may be viewed directly.

This invention is particularly well adapted for use by dentists, doctors, engineers, builders, artists, cosmetologists, and numerous others engaged in work which may be illustrated by pictorial representations. For example, the present invention is well adapted for use in viewing photographic transparencies, which may be of the X-ray type or colored photographs made by dentists of their patients before and after the patients have been subjected to dental work. This invention is equally well adapted for viewing, comparing, storing, or exhibiting transparencies in monochrome or color.

The combined holder and projection slide of this invention is further characterized by the provision of means whereby the delicate surfaces of photographic transparencies may be suitably protected from finger marks, staining, abrasion, or other disfigurement.

Moreover, the holder and slide of this invention is a complete article and may be used without the necessity of applying additional tape or other binding materials to the edges, without requiring additional materials or tools for its proper operation and use, and without the necessity of using additional adhesives.

Generally speaking, the holder and slide of the present invention comprises an outer envelope member made of sheet material including two, spaced, adjacent, virtually parallel, virtually coextensive, apertured halves. The apertures in one half are adapted to register or be in alignment with the apertures in the other half. Three edges of the envelope member are closed or joined together by any suitable means and the fourth edge thereof is open and provided with a sealable flap for closure thereof.

An inner, ported, transparency mounting member is provided with recesses for mounting transparencies in alignment with the ports therein. The mounting member is provided with tabs adjacent the recesses for holding the transparencies in the recesses in alignment with the ports, or self-sealing spot tabs to hold film or transparency in place and in alignment. A foldable sheet of transparent material is adapted to be folded about and in contact with opposite faces of said inner transparency mounting member so as to protect the transparencies mounted in the recesses.

The entire assembly, comprising the inner member with the transparencies mounted in the recesses in alignment with the ports and protected by the transparent covering is adapted to be inserted into the outer envelope member so that corresponding transparencies, ports, and apertures will be in virtual alignment or registry. The sealable flap on the open side of the outer envelope member may then be closed for sealing the entire assembled slide and transparencies together.

It is an object of the present invention to disclose and provide a simple, cheap holder or mount or projection slide for a plurality of pictorial representations or transparencies whereby said transparencies may be simultaneously projected or viewed directly by transmitted light for purposes of comparison and study.

These and other objects and advantages of the invention will become apparent from the following description and illustration of the exemplary form of the invention and the appended claims. In order to facilitate understanding, reference will be had to the following drawings, in which:

Fig. 1 is a front view in elevation of the entire mount and transparencies in assembled position, various portions of the assembly being broken away to facilitate understanding.

Fig. 2 is a side elevation in section taken along the plane II—II of Fig. 1.

Fig. 3 is an exploded, front, elevational view with the various portions of the assembly separated from one another to clarify the assembly of the mount.

More specifically, in the exemplary form of the invention described and illustrated herein, an outer envelope member generally indicated at 1, which may be made of sheet cardboard or various other suitable materials, if desired, is provided. Said envelope member has two, adjacent, spaced, parallel, coextensive, apertured halves 2 and 3 which are joined together along the two side edges and the bottom edge of the envelope member 1 with a fold or spacer 4 between said edges. Said edges and the spacer 4 may be attached, fixed, cut and folded, scored or creased, or cemented together by any suitable means. At the top edge of the envelope member 1, the two, coextensive halves 2 and 3 do not have a spacer therebetween but are spaced apart so as to have a slot therebetween. Thus the envelope member 1 is open at the top and is closed at the two side edges and the bottom edge thereof.

The center portion of the top edge of the front half 3 of the envelope member 1 is provided with a downwardly extending recess 5, the purpose of which will be hereinafter explained. The top edge of the back half 2 of the envelope member 1 is provided with a sealable flap 6 which is provided with an adhesive surface 7 and which is adapted to be folded over and upon the upper front portion of the front half 3 of the envelope member 1 and to be affixed thereto by means of the adhesive surface 7. The front and back halves 3 and 2 of the envelope member 1 are provided with coextensive apertures 8 which are in alignment or registry with each other. Thus we have provided an envelope member closed along three edges thereof and open along the fourth edge, and provided with flap means for sealing said open edge of the envelope member, said envelope member being provided with a single or a plurality of apertures therethrough in virtual registry or alignment.

An inner, ported, transparency mounting member, indicated generally at 9, which may be made of sheet cardboard, or various other suitable materials, if desired, is provided with recesses 10 positioned around ports 11 which pass completely through the inner transparency mounting member 9. Along the lower edges of the recesses 10 upwardly extending holding tabs 12 are provided. The holding tabs 12 are integral with the main body portion of the mounting member 9 and extend out over the recess portion 10 so that a transparency may be positioned in the recess 10 with the edges of said transparency virtually abutting the surrounding main body portion of the mounting member 9 and with the lower edge of the transparency slipped under the holding tabs 12 so as to be retained or held between the holding tabs 12 and the lower edge of the recess 10. Thus the transparency is held or retained in the recess 10 by means of the holding tabs 12.

Another means of retaining or holding the film or transparency in position within the recess portion is by means of small adhesive tabs to be applied over edges of the film or transparency and the edge of the recess surface.

We have also provided a transparent, protective, folded covering 13 which may, for example, be made of any suitable transparent material such as various plastic, resinous, or cellulosic materials, one such example being ordinary, commercial, clear, sheet acetate. The inner, transparency mounting member 9 with the transparencies 14 mounted in alignment with the ports 11 in the recesses 10 and retained or held therein by the holding tabs 12 are adapted to be positioned between the folded halves of the transparent, protective covering 13 so as to protect the transparencies 14 from finger marks, abrasions, stains, or disfigurement of any kind.

The assembly, comprising the inner, transparency mounting member 9 with the transparencies mounted therein positioned within the protective covering 13, is adapted to be inserted thereinto through the top, open edge of the envelope member 1 so that the apertures 8 in the halves 2 and 3 of the outer envelope member 1 are in virtual registry or alignment with the ports 11 in the inner, transparency mounting member 9 and with the transparencies 14. Then, if desired, the flap 6 may be folded down and the adhesive surface 7 thereof caused to adhere to the front upper portion of the front half 3 of the outer envelope member 1 for sealing or closing said envelope member 1. The adhesive surface 7 along the inner or front face of the flap 7 may be of any of the well-known types of adhesives such as a gummed surface, a glue surface, various resinous surfaces, or it may be of any of the well-known types of pressure-sealing adhesives, if so desired.

If a pressure-sealing adhesive is used, the flap 6 may be separated from adhesive contact with the front upper edge of the half 3 of the envelope member 1 at will, thus opening the envelope so that the inner transparency mounting member 9 may be removed. The notch or recess 5 in the center of the top edge of the front half 3 of the envelope member 1 facilitates manual gripping of the inner transparency mounting member 9 for removal from the envelope member 1.

The entire assembled slide, with the transparencies 14, the apertures 8 in the front and back halves 3 and 2 of the envelope member 1, and the ports 11 of the inner transparency mounting member 9 in virtual registry or alignment may then be inserted into any suitable projector for projecting the transparencies upon any suitable medium for simultaneous or individual viewing and detailed examination thereof, or said assembled slide may be mounted in any suitable viewer for viewing directly by transmitted light.

Throughout the specification and claims, the term "projection" shall be interpreted to include both actual projection upon a screen and viewing directly by transmitted light.

While the illustrations and description herein refer to a transparency mount adapted to mount a plurality of transparencies, it may also be modified to mount a single transparency in a similar manner, if so desired.

While a single embodiment of the present invention has been illustrated and described, it will now be apparent to those skilled in the art that certain changes, additions, omissions and substitutions may be made in the exemplary form shown without departing from the spirit and scope of the invention as defined by the appended claims.

We claim:

1. A protective holder for transparencies comprising: a pair of coextensive plane outer wall members; a spacer strip connecting edge areas of inner surfaces of said wall members and extending along three side edges thereof to form a pocket having one open edge; a plurality of apertures in each side wall member, the apertures of one side wall member being in alignment with the apertures in the other wall member; a mounting member slidable into the pocket between said spaced side wall members and spacer strip, said mounting member being provided with a plurality of ports corresponding in number, size and arrangement with the apertures in the side wall members and arranged to be in alignment with the apertures when the mounting member is in the pocket; a transparency-receiving recess formed in the mounting member around each port, said spacer strip maintaining the wall members in spaced relation to enclose the mounting member and transparencies carried thereby while the entire outer surfaces of the wall members are in parallel planes.

2. A protective holder for transparencies comprising: a pair of coextensive plane outer wall members; a spacer strip connecting edge areas of inner surfaces of said wall members and extending along three side edges thereof to form a pocket having one open edge; a plurality of apertures in each side wall member, the apertures of one side wall member being in alignment with the apertures in the other wall member; a mounting member slidable into the pocket between said spaced side wall members and spacer strip, said mounting member being provided with a plurality of ports corresponding in number, size and arrangement with the apertures in the side wall members and arranged to be in alignment with the apertures when the mounting member is in the pocket; a transparency-receiving recess formed in the mounting member around each port; and a folded sheet of transparent material enclosing the mounting member, said spacer strip maintaining the wall members in spaced relation to enclose the mounting member and transparencies carried thereby and transparent sheet while the entire outer surfaces of the wall members are in parallel planes; and gummed tab means for sealing the open edge leading to the pocket.

EARL T. BOADEN.
            JOSEPH L. SIMPSON.

REFERENCES CITED

The following references are of record in the file of this patent:

UNITED STATES PATENTS

| Number | Name | Date |
|---|---|---|
| 1,274,804 | Spitzer | Aug. 6, 1918 |
| 1,617,304 | Groeschel | Feb. 8, 1927 |
| 1,904,318 | Lehere | Apr. 18, 1933 |
| 2,148,124 | Jullmann | Feb. 21, 1939 |
| 2,227,973 | Hood | Jan. 7, 1941 |
| 2,256,399 | MacHarg | Sept. 16, 1941 |
| 2,291,173 | Simpson | July 28, 1942 |
| 2,323,532 | Fuller | July 6, 1943 |
| 2,432,515 | Sherbinin | Dec. 16, 1947 |